United States Patent
Wang et al.

(10) Patent No.: US 8,599,154 B2
(45) Date of Patent: Dec. 3, 2013

(54) METHOD OF IMAGE TOUCH PANEL

(75) Inventors: Yu-Cheng Wang, Chung Li (TW);
Shih-Hsiung Twu, Chung Li (TW)

(73) Assignee: Chung Yuan Christian University, Chung Li (TW)

( * ) Notice: Subject to any disclaimer, the term of this patent is extended or adjusted under 35 U.S.C. 154(b) by 459 days.

(21) Appl. No.: 12/853,584

(22) Filed: Aug. 10, 2010

(65) Prior Publication Data

US 2011/0096004 A1 Apr. 28, 2011

(30) Foreign Application Priority Data

Oct. 27, 2009 (TW) .............................. 98136267 A

(51) Int. Cl.
*G06F 3/041* (2006.01)

(52) U.S. Cl.
USPC .......................................... 345/173; 345/175

(58) Field of Classification Search
USPC ................................................ 345/173, 175
See application file for complete search history.

(56) References Cited

U.S. PATENT DOCUMENTS

| 2003/0103065 | A1* | 6/2003 | Masera et al. ................ 345/660 |
| 2007/0063981 | A1* | 3/2007 | Galyean et al. ............... 345/173 |
| 2008/0143690 | A1* | 6/2008 | Jang et al. .................... 345/175 |
| 2010/0073302 | A1* | 3/2010 | Ritzau et al. ................. 345/173 |

* cited by examiner

*Primary Examiner* — Dwayne Bost
*Assistant Examiner* — Yungsang Lau
(74) *Attorney, Agent, or Firm* — Rosenberg, Klein & Lee

(57) ABSTRACT

The present invention relates to a method of image touch panel, which comprises the steps of first extracting a background image, comparing the background and a touch image for producing a positioning image, positioning a location of the touch image according to the positioning image for giving the location touched by a user, and hence executing the corresponding function. Thereby, the function of a touch panel can be achieved. By adopting the method of image touch panel according to the present invention, it is not necessary to purchase a physical touch panel to own the functions the touch panel has for executing the functions provided by an electronic product with ease. In addition, the present uses mid- to low-end cameras, and hence reducing the costs.

11 Claims, 6 Drawing Sheets

METHOD OF IMAGE TOUCH PANEL

FIELD OF THE INVENTION

The present invention relates generally to a panel, and particularly to a method of image touch panel.

BACKGROUND OF THE INVENTION

Owing to global competition, advancement in information technology, and the prevalence of computer technologies, there are one or more computers in every house. However, the peripherals of a computer, such as the display, the keyboard, the speaker, and the mouse, occupy much space. In particular, the mouse takes up the relatively largest room. In addition, a user has to operate a computer by means of a mouse. When the user uses the mouse to operate the computer over a long period of time, fatigue or even injuries in hands occur. Thereby, how to reduce the space required by a mouse and how to facilitate a user to operate a computer has become a major subject today.

Due to the reasons described above, many electronic products adopt touch panels for reducing the required space and for eliminating the need of a mouse for operating a computer. A touch panel is a typical input device. By pressing lightly the function displayed on the panel using the finger or a touch stylus, a user can executes the function provided by the electronic product with ease and convenience. Because of its friendly interface and convenience, the applications of a touch panel are increasing. Depending on the structures and the sensing methods, touch panels can be categorized into resistive, capacitive, optical, acoustic, and electromagnetic touch panels. Accordingly, the development of modern touch panels has been very mature.

Nevertheless, current touch panels are still high-tech products. Their manufacturing technologies are relatively complicated, and hence making their price prohibitively high. Thereby, when some schools, institutions, or homes in short of funds plan to purchase multimedia equipment, the budget problem prohibits them from adopting touch panels.

Accordingly, the present invention provides a method of image touch panel for solving the drawbacks described above. It facilitates users to operate computers without mice and to execute the functions provided by the computers with ease. According to the present invention, the users need not to purchase touch panels for fulfilling the functions of the touch panels. Besides, the present invention adopts mid- and low-end cameras, and hence reducing costs and solving the problems described above.

SUMMARY

An objective of the present invention is to provide a method of image touch panel, which produces a positioning image by extracting a background image and a touch image, positions a location of the touch image according to the positioning, and judges the location touched by a user. Thereby, the function of a touch panel is achieved at a reduced cost.

Another objective of the present invention is to provide a method of image touch panel, which judges if the right-click function of a mouse is executed according to the total pixel number of the touch image. Thereby, whether the user executes the right-click function of a mouse is judged by a simple method.

Still another objective of the present invention is to provide a method of image touch panel, which determines if the user executes the left-click function of a mouse by judging the touch locations of a plurality of touch images. Thereby, whether the user executes the left-click function of a mouse is judged by a simple method.

The method of image touch panel according to the present invention comprises the steps of first extracting a background image, comparing the background and a touch image for producing a positioning image, positioning a location of the touch image according to the positioning image for giving the location touched by a user, and hence executing the corresponding function. Thereby, the function of a touch panel can be achieved. By adopting the method of image touch panel according to the present invention, it is not necessary to purchase a physical touch panel to own the functions the touch panel has for executing the functions provided by an electronic product with ease. In addition, the present uses mid- to low-end cameras, and hence reducing the costs.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
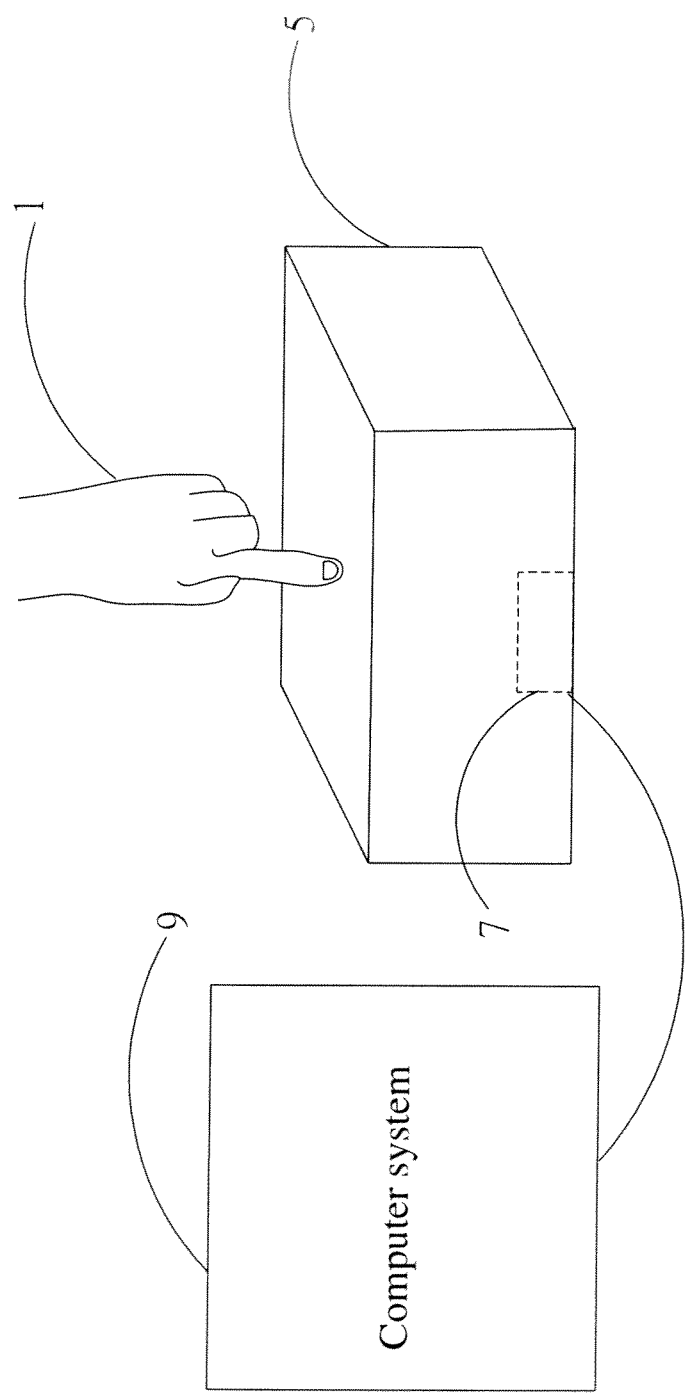
FIG. 1 shows a block diagram according to a preferred embodiment of the present invention.
Figure 2:
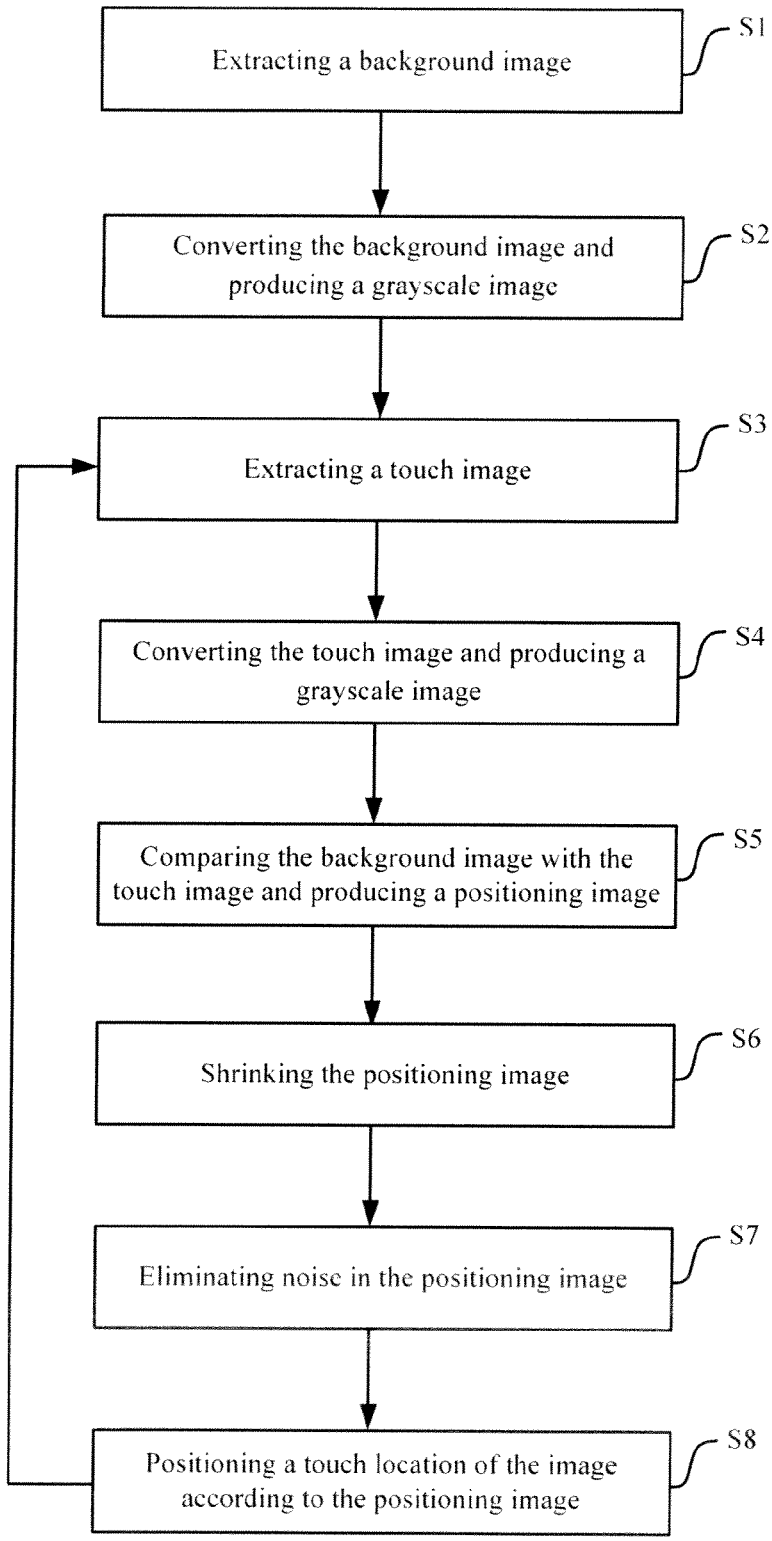
FIG. 2 shows a flowchart of a method of image touch panel according to a preferred embodiment of the present invention.

FIG. 1 and FIG. 2 show a block diagram and a flowchart according to a preferred embodiment of the present invention. As shown in the figures, the method of image touch panel according to the present invention needs only a housing 5, a camera 7, and a computer system 9. The camera is disposed in the housing 5 and is connected with the computer system 9 for transmitting the extracted images to the computer system 9 for processing and analyzing. The housing 5 described above has to be pervious to light and thus acting as a virtual touch panel. The method of image touch panel according to the present invention comprises the following steps. Firstly, as shown in the step S1, the camera 7 extracts a background image. In other words, the camera 7 extracts the image of the housing 5 and transmits the image to the computer system 9. Then, as shown in the step S2, the computer system 9 converts the background image to a grayscale image. Next, as shown in the step S3, extract a touch image. When a user's finger 1 presses the housing 5, the camera 7 will extract the image to the touch image, and transmit the touch image to the computer system 9.

Afterwards, as shown in the step S4, the computer system 9 converts the touch image extracted by the camera 7 to a grayscale image. Then, as shown in the step S5, compare the background image and the touch image for producing a positioning image. According to the present invention, the computer system 9 adopts the image subtraction method, namely, subtracting the corresponding grayscale image of the touch image from the corresponding grayscale image of the background image, for producing the positioning image. The positioning image is the image of the user's finger 1 when the user touches. Next, as shown in the step S8, the computer system 9 can positions the touched location of the touch image according to the positioning image and give the location touched by the user's finger 1. That is to say, the user can touch the desired function displayed by the computer system 9 as a function pattern and hence executing the function. The steps S3 to S8 described above are performed repeatedly for detecting the touching status of the user.

The method by which the touched location of the touch image is given according to the positioning image is summing up the vertical coordinates and the horizontal coordinates of all pixels, respectively, dividing the sums by the total number of the pixels, and hence giving center coordinates. Thereby, the touched location of the touch image is positioned, which means the location where the user's finger 1 touches is given.

Refer again to FIG. 2. According to the present invention, the steps S6 and S7 are further included between the steps S5 and S8. The step S6 is to shrink the positioning image for accelerating the subsequent processing speed of the computer system 9. One of the methods of shrinking the positioning image according to the present invention is adopting an image division method. For example, shrink the positioning image with 320×240 pixels to an image with 64×48 pixels. When the number of pixels is reduced, the required processing time is decreased accordingly. The step S7 is to eliminate the noise in the positioning image. Namely, the image of the shadow of the user's palm is eliminated for avoiding misjudgment of the user's touch location. One of he methods of eliminating the noise in the positioning image according to the present invention is to adopt an object linking method, which considers linked pixels as an object. Thereby, the positioning image will contain a plurality of objects including the corresponding object of the image of the user's finger 1 when the user touches as well as the corresponding object of the shadow of the palm. Because the shadow of the palm is larger, the corresponding object is larger. Accordingly, the present invention sets a noise threshold value. When the object exceeds the noise threshold value, the object is judged noise, and hence is eliminated from the positioning image. In this way, the function of eliminating noise is achieved.

Figure 3:
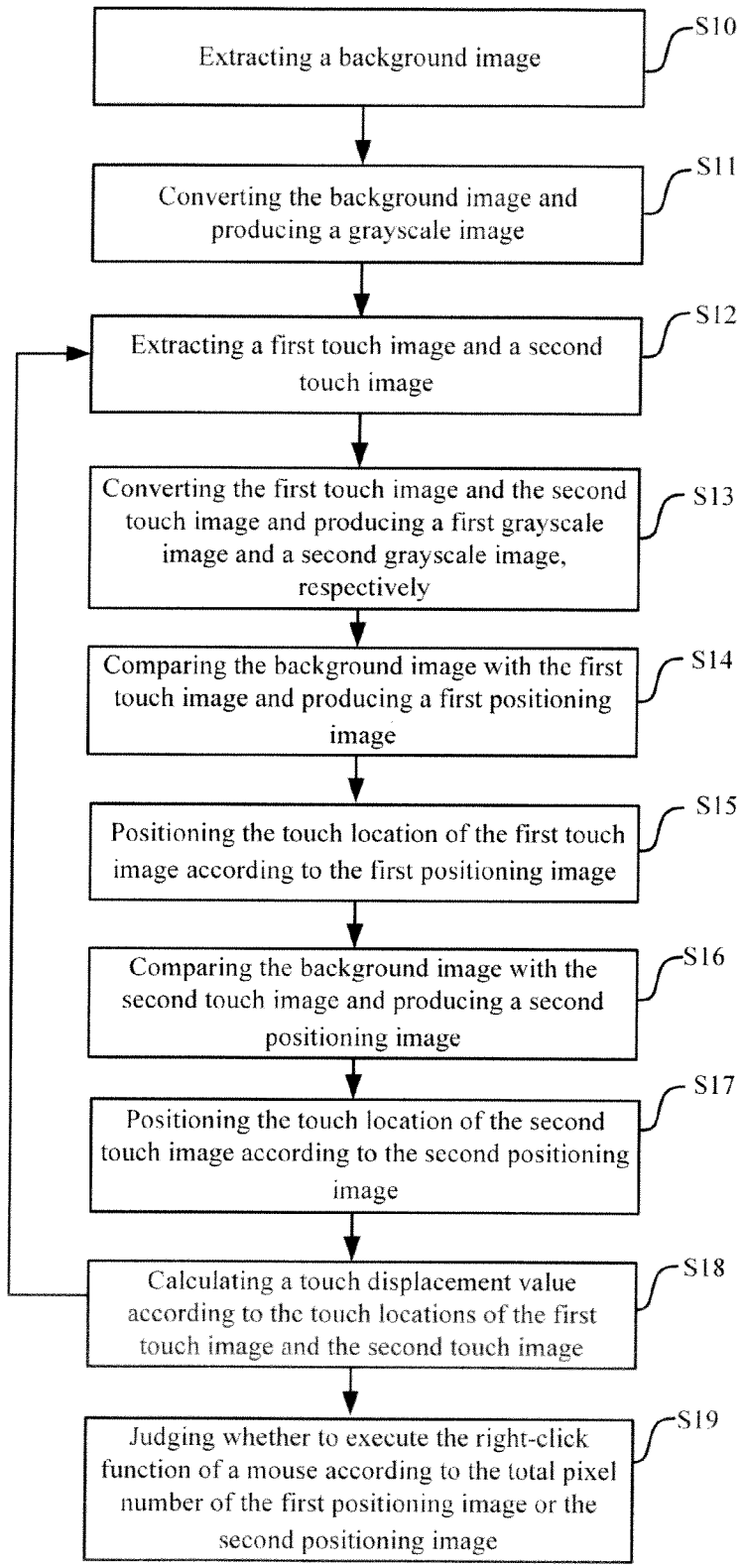
FIG. 3 shows a flowchart of a method of image touch panel according to a second preferred embodiment of the present invention.
Figure 4:
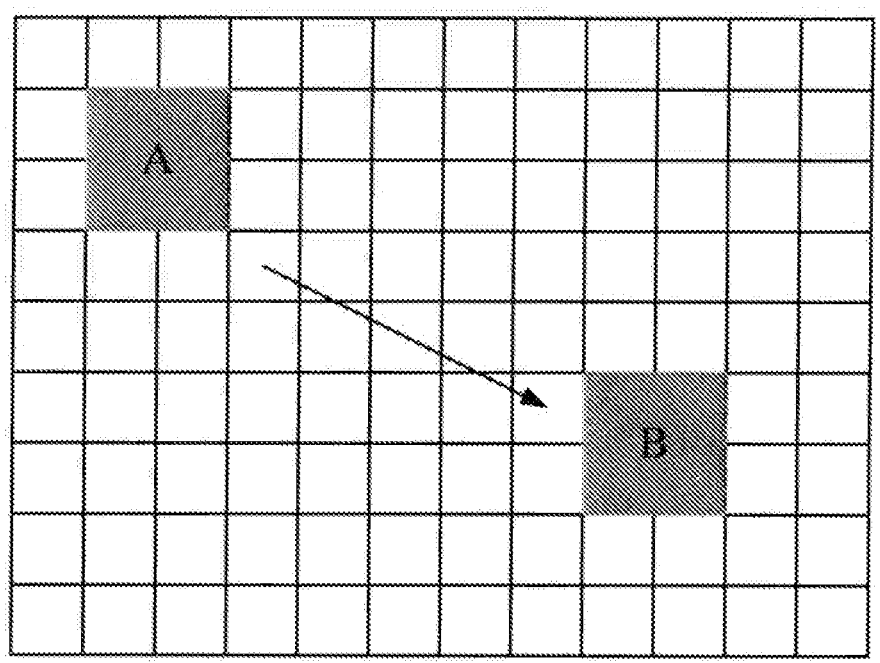
FIG. 4 shows a schematic diagram of the touch displacement of a method of image touch panel according to a preferred embodiment of the present invention.

FIG. 3 and FIG. 4 show a flowchart and a schematic diagram of the touch displacement of a method of image touch panel according to another preferred embodiment of the present invention. As shown in the figures, firstly as shown in the step S10, the camera 7 extracts a background image and transmits the background image to the computer system 9. Then, as shown in the step S11, the computer system 9 converts the background image to a grayscale image. Next, as shown in the step S12, the camera 7 extracts a first touch image and a second image at different time and transmits them to the computer system 9. Afterwards, as shown in the step S13, the computer system 9 converts the first touch image and the second touch image extracted by the camera 7 to a first grayscale image and a second grayscale image. Then, as shown in the step S14, the computer system 9 compares the background image and the first touch image for producing a first positioning image. In this step, the corresponding grayscale image of the background image and the corresponding grayscale image of the first touch image are compared using the image subtraction method for producing the first positioning image. Next, as shown in the step S15, the computer system 9 positions a touch location of the first touch image according to the first positioning image. The method positioning is the same as the one described in the previous embodiment.

After that, as shown in the step S16, the computer system 9 compares the background image and the second touch image for producing a second positioning image. Namely, the corresponding grayscale image of the background image and the corresponding grayscale image of the second touch image are compared for producing the second positioning image. The, as shown in the step S17, a touch location of the second touch image is positioned according to the second positioning image. Next, as shown in the step S18, the touch displacement between the first and the second touch images is calculated according to the touch location of the first touch image and the touch location of the second touch image. In other words, the displacement coordinates between the first touch location and the second touch location is judged, which represent the displacement of the user's finger 1 moving from the first touch location to the second touch location. The steps S12 to S18 described above are performed repeatedly for detecting the touching status of the user.

As shown in FIG. 4, the example shows moving from the touch location A of the first touch image to the touch location B of the second touch image. According to the present invention, the coordinates of the touch location A of the first touch image and of the touch location B of the second touch image are acquired first. Subtracting the coordinates of the touch location B of the second touch image from the coordinates of the touch location A of the first touch image gives a displacement value. Thereby, the computer system 9 can control the location of the pointer according to the displacement value, and hence controlling the pointer to move to the user's desired location.

In addition, as shown in the embodiment of FIG. 2, between the steps S14 and S15, the present embodiment can further adopt the image division method to shrink the first positioning image, and use the object linking method to eliminate the noise in the first positioning image. Likewise, between the steps S16 and S17, the present embodiment can also adopt the image division method to shrink the second positioning image, and use the object linking method to eliminate the noise in the second positioning image.

Besides, because the right button of a general mouse can be pressed to execute the corresponding function, the present invention can further judge if the user is executing the right-click function of a mouse according to the image extracted by the camera 7. When the user needs to execute the function similar to the right-click function of a mouse, he has to use two fingers to touch, which produces a larger image. Thereby, as the step S19 according to the present invention, the total pixel number of the first positioning image or the second positioning image can be used to judge if the user is executing the right-click function of a mouse. If the total pixel number exceeds a threshold value set by the computer system 9, it is determined that the user is executing the right-click function of a mouse, then the computer system 9 executes the corresponding function.

Figure 5:
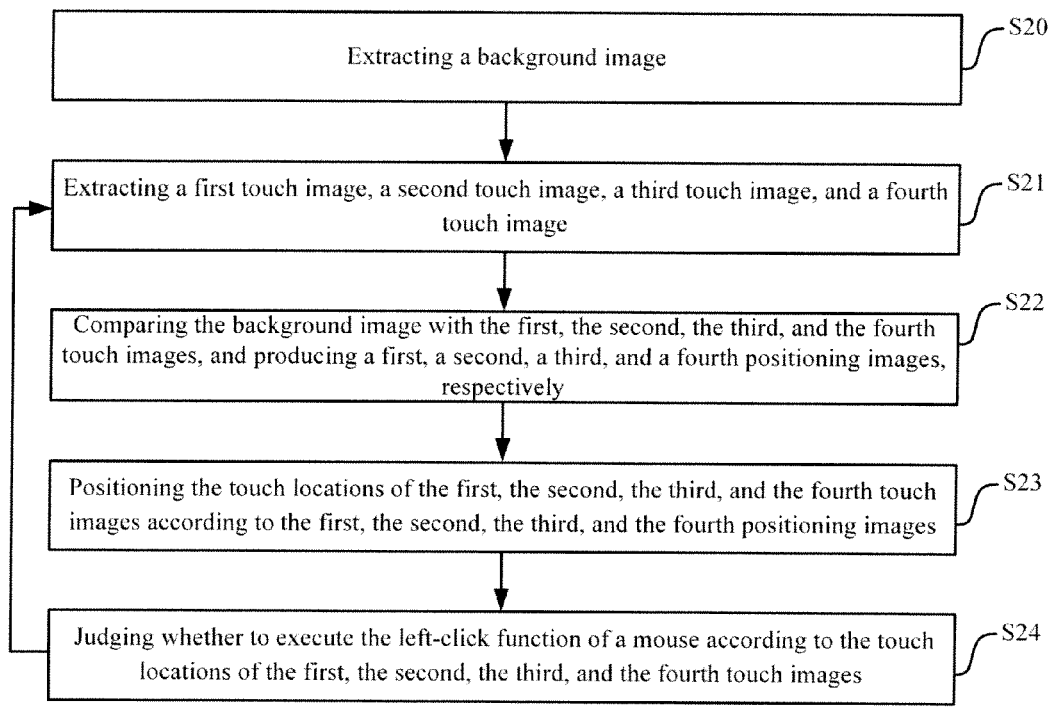
FIG. 5 shows a flowchart of a method of image touch panel according to a third preferred embodiment of the present invention.

FIG. 5 shows a flowchart of a method of image touch panel according to another preferred embodiment of the present invention. According to the present embodiment, the image extracted by the camera 7 can be used to judge if the user is executing the left-click function of a mouse. When a general user uses a touch panel, the finger 1 touches the touch panel firstly. Thereby, according to the present invention, the left-click function of a mouse is defined as the finger 1 touching and untouching the touch panel repeatedly in a certain period.

Specifically, the command includes four actions: touching, untouching, touch, and untouching. If in a certain period, the user performs the above actions, it is determined that the user is executing the left-click function of a mouse. Then the computer system 9 will execute the function corresponding to the left-click function of a mouse. In the following, FIG. 5 is used to describe in detail the flow by which the computer systems 9 judges if the user is executing the left-click function of a mouse.

Referring again to FIG. 5, according to the present embodiment, as shown in the step S20, the camera 7 first extracts a background image. Then, as shown in the step S21, the camera 7 extracts a first touch image, a second touch image, a third touch image, and a fourth touch image. After the steps S20 and S21, like the previous embodiment, the extracted background image, the first touch image, the second touch image, the third touch image, and the fourth touch image are converted to grayscale images. Next, as shown in the step S22, compare the background image with the first touch image, the second touch image, the third touch image, and produce a first positioning image, a second positioning image, a third positioning image, and a fourth positioning image. In this step, the computer system 9 the corresponding grayscale image of the background image is compared with the corresponding grayscale images of the first touch image, the second touch image, the third touch image, and the fourth touch image, respectively, and producing the first positioning image, the second positioning image, the third positioning image, and the fourth positioning image.

Afterwards, as shown in the step S23, the computer system 9 positions the touch locations of the first touch image, the second touch image, the third touch image, and the fourth touch image, respectively, according to the first positioning image, the second positioning image, the third positioning image, and the fourth positioning image. Thereby, the touching actions of the user in a period can be given. Then, as shown in the step S24, the computer system 9 judges if the user's touching action represents executing the left-click function of a mouse according to the touch locations of the first touch image, the second touch image, the third touch image, and the fourth touch image. In other words, whether the user's finger 1 performs the touching, untouching, touching, and untouching actions sequentially in a certain period at the same location is judged. If so, the computer system 9 determined that the user is executing the left-click function of a mouse, and hence executes the corresponding function.

Moreover, before executing the step S23 described above, shrinking and noise elimination of the first positioning image, the second positioning image, the third positioning image, and the fourth positioning image can be performed first. Thereby, the subsequent processing speed of the computer system 9 can be enhanced, and the influence of noise on the touch accuracy can be prevented. Besides, according to the present embodiment, the steps S21 to S24 are executed repeatedly for detecting the user's status any time. The number of repeated touches in a certain period by the user, which represents the number of left clicks of a mouse in the certain period, can be judged and hence the corresponding function can be executed. For example, in a certain period, if the touches are equivalent to two left clicks of a mouse, the computer system 9 executes the selected file or program by the user. Alternatively, in a certain period, if the touches are equivalent to three left clicks of a mouse, the computer system 9 selects the whole paragraph or page of the selected article.

Figure 6:
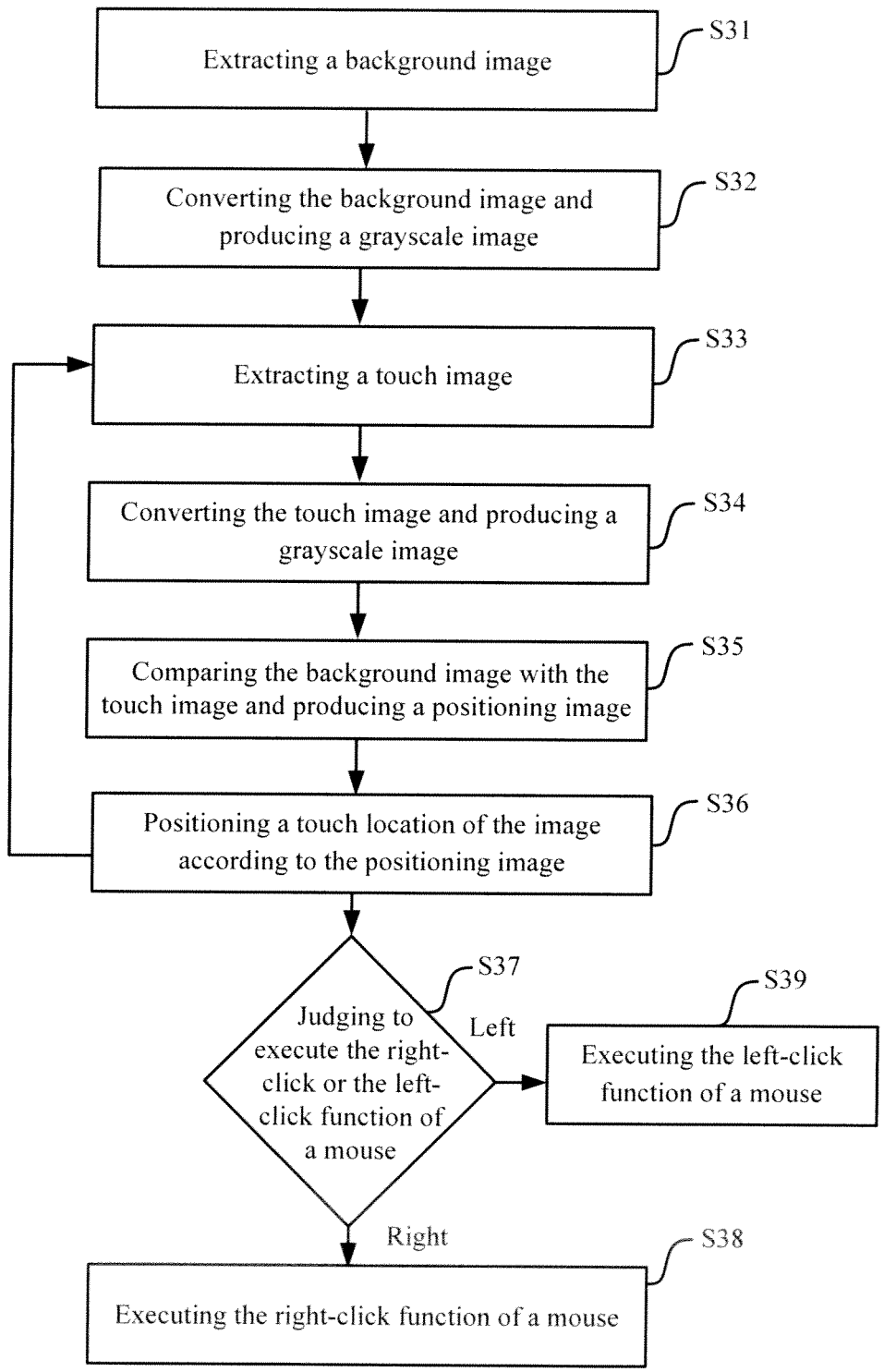
FIG. 6 shows a flowchart of a method of image touch panel according to a fourth preferred embodiment of the present invention.

FIG. 6 shows a flowchart of a method of image touch panel according to another preferred embodiment of the present invention. As shown in the figure, the present embodiment integrates the flows of FIGS. 2, 3, and 5, and let the user perform single-point touching, displacement touching, right-click touching, and left-click touching operations. The present embodiment executes the steps S31 to S36 sequentially. First, the camera 7 extracts a background image a plurality of touch images, and transmits the images to the computer system 9, which converts the background image and the touch images to grayscale images, respectively. By comparing the corresponding grayscale image of the background image and each corresponding grayscale image of the touch images, namely, by comparing the difference between the background image and each touch image, a plurality of positioning images are produced. The computer system 9 positions the touch location of each touch image according to each positioning image, and gives the user's touch locations at different time. Thereby, whether single-point touching or displacement touching is executed by the user can be determined, and hence the corresponding function or pointer movement can be executed.

Furthermore, as shown in the step S37, the computer system 9 can judge if the user performs the right-click or left-click function of a mouse according to the touch locations of the multiple touch images given in the step S36. Then the steps S38 or S39 can be executed, respectively, for the computer system 9 to execute the right-click or left-click function of a mouse according to the judgment result. The steps S37 judges if the user executes the right-click or left-click function of a mouse, just like the step S19 in the embodiment of FIG. 3, which judges if the user executes the right-click function of a mouse, or like the embodiment of FIG. 5, which judges if the user executes the left-click function of a mouse. In addition, before executing the step S36, shrinking and noise elimination of the positioning images can be performed for enhancing the processing speed and accuracy of the computer system 9. Besides, in addition to applied to the computer system 9, all of the embodiments according to the present invention described above can also be applied to other general electronic devices, such as multimedia devices. Thereby, users need not to purchase physical touch panels in order to operate the electronic device by touching.

To sum up, the method of image touch panel according to the present invention comprises the steps of first extracting a background image, comparing the background and a touch image for producing a positioning image, positioning a location of the touch image according to the positioning image for giving the location touched by a user, and hence executing the corresponding function. Thereby, the function of a touch panel can be achieved. By adopting the method of image touch panel according to the present invention, it is not necessary to purchase a physical touch panel to own the functions the touch panel has for executing the functions provided by an electronic product with ease. In addition, the present uses mid- to low-end cameras, and hence reducing the costs.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A method of image touch panel, comprising steps of:
   extracting a background image through a camera, the camera disposed in a housing and under a virtual touch panel of the housing, the housing being pervious to light, the camera extracting the background image from the virtual touch panel;

converting said background image and producing a grayscale image after extracting said background image;

extracting a touch image through the camera, the camera extracting the touch image from the virtual touch panel;

converting said touch image and producing a grayscale image after extracting said touch image;

comparing the grayscale image of said background image with said grayscale image of the touch image, and producing a positioning image; and positioning a touch location of said touch image according to said positioning image.

2. The method of image touch panel of claim 1, and further comprising a step of shrinking said positioning image after said step of comparing said background image with said touch image and producing said positioning image.

3. The method of image touch panel of claim 1, and further comprising a step of eliminating at least a noise in said positioning image after said step of comparing said background image with said touch image and producing said positioning image.

4. The method of image touch panel of claim 1, and further comprising a step of judging whether to execute the right-click function of a mouse according to a total pixel number of said positioning image.

5. The method of image touch panel of claim 4, wherein said step of judging whether to execute the right-click function of a mouse according to said total pixel number of said positioning image is to judge if said total pixel number is greater than a threshold value; and when said total pixel number is greater than said threshold value, the right-click function of a mouse is executed.

6. A method of image touch panel, comprising steps of:

extracting a background image through a camera, the camera disposed in a housing and under a virtual touch panel of the housing, the housing being pervious to light, the camera extracting the background image from the virtual touch panel;

converting said background image and producing a grayscale image after extracting said background image;

extracting a first touch image and a second touch image through the camera, the camera extracting the first touch image and the second touch image from the virtual touch panel;

converting said first touch image and said second touch image and producing a grayscale image corresponding to said first touch image and a grayscale image corresponding to said second touch image, respectively, after extracting said first touch image and said second touch image;

comparing the grayscale image of said background image with said grayscale image corresponding to the first touch image, producing a first positioning image;

positioning a touch location of said first touch image according said first positioning image;

comparing the grayscale image of said background image with said grayscale image corresponding to the second touch image, and producing a second positioning image;

positioning a touch location of said second touch image according said second positioning image; and calculating a touch displacement value according to said touch location of said first touch image and said touch location of said second touch image.

7. The method of image touch panel of claim 6, and further comprising a step of shrinking said first positioning image after said step of comparing said background image with said first touch image and producing said first positioning image.

8. The method of image touch panel of claim 6, and further comprising a step of eliminating at least a noise in said first positioning image after said step of comparing said background image with said first touch image and producing said first positioning image.

9. The method of image touch panel of claim 6, and further comprising a step of shrinking said second positioning image after said step of comparing said background image with said second touch image and producing said second positioning image.

10. The method of image touch panel of claim 6, and further comprising a step of eliminating at least a noise in said second positioning image after said step of comparing said background image with said second touch image and producing said second positioning image.

11. The method of image touch panel of claim 6, and further comprising steps of:

extracting a third touch image and a fourth touch image;

comparing said background image with said third touch image, and producing a third positioning image;

positioning a touch location of said third touch image according said third positioning image;

comparing said background image with said fourth touch image, and producing a fourth positioning image;

positioning a touch location of said fourth touch image according said fourth positioning image; and judging whether to execute the left-click function of a mouse according to said touch locations of said first touch image, said second touch image, said third touch image, and said fourth touch image.

* * * * *